United States Patent [19]
Gordon

[11] 3,767,018
[45] Oct. 23, 1973

[54] BRAKE SHOE AND METHOD OF MANUFACTURE THEREOF

[75] Inventor: Robert M. Gordon, Woodbridge, Conn.

[73] Assignee: Milford Rivet and Machine Company, Milford, Conn.

[22] Filed: Jan. 21, 1971

[21] Appl. No.: 108,312

[52] U.S. Cl. .............................. 188/250 G, 85/37
[51] Int. Cl. ............................................ F16d 69/00
[58] Field of Search ............... 188/73.1, 250 G, 188/250 B; 29/460; 85/37

[56] References Cited
UNITED STATES PATENTS
2,067,677  1/1937  Murphy ................. 188/250 R
3,452,638  7/1969  Lauer ..................... 85/37

Primary Examiner—Richard E. Aegerter
Attorney—Johnson & Kline

[57] ABSTRACT

A brake shoe consisting of a friction pad and a metal support with the support having a plurality of shouldered rivets clinched thereto with the friction pad being molded to shape against the support and hardened to have portions encircling the shoulders to mechanically secure the pad to the support.

2 Claims, 9 Drawing Figures

PATENTED OCT 23 1973 3,767,018
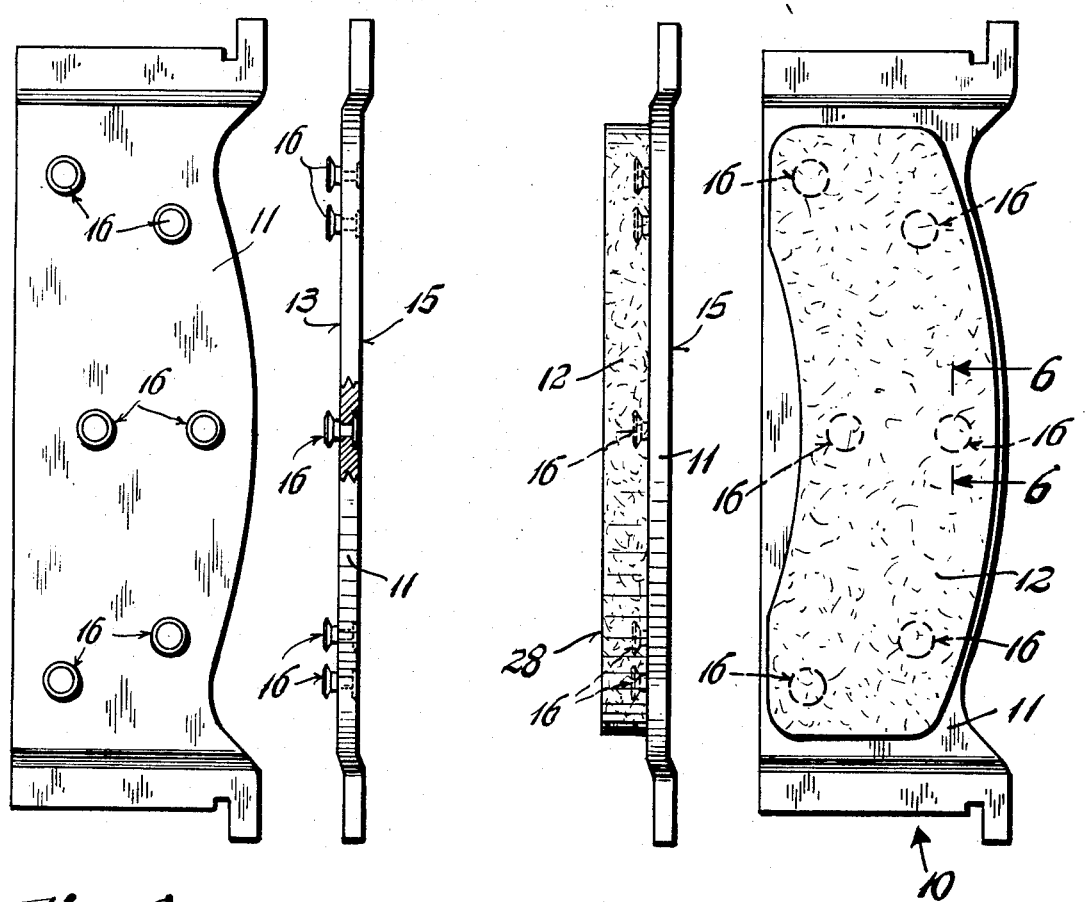
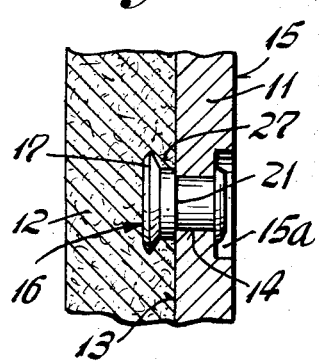
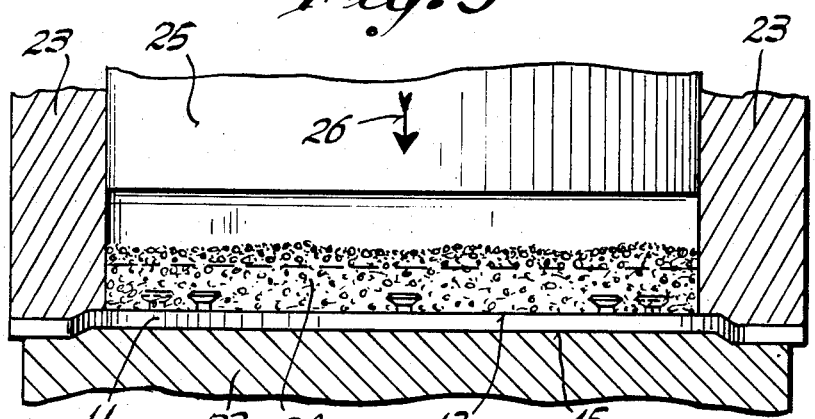
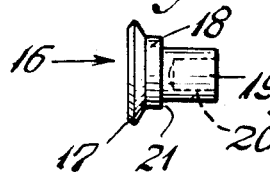
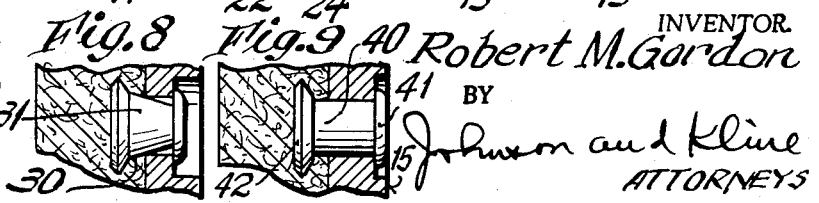
INVENTOR.
Robert M. Gordon
BY
Johnson and Kline
ATTORNEYS

BRAKE SHOE AND METHOD OF MANUFACTURE THEREOF

The present invention has particular utility when used to make brake shoes for disk type brakes of an automobile, though it may have uses in other devices employing friction type clutches. Such shoes normally consist of a friction pad secured on a metal support plate and braking is achieved by forcing two pads together to clamp therebetween a disk rotating with the wheel desired to be braked. The surfaces of the friction pads rub against the surfaces of the disk, while the metal support provides rigidity and strength to the pad and enables pressure to be exerted evenly throughout the surface of the pad.

Though such a shoe has only two parts, difficulties have been encountered in attempting to provide a satisfactory shoe and the difficulties appear to be especially related to the securing of the pad to the support. One common method of making a brake shoe involves gluing or bonding together the pad and support and which, though providing securement, has caused undesired squeaking and/or squealing of the brake when used on at least larger size automobiles. Another presently employed method has involved forming both the pad and the support with aligned apertures and riveting them together and which, while providing both securement and a quiet shoe, is somewhat expensive to manufacture at least with respect to machining the apertures in the friction pad and the maintenance of accuracy between the apertures.

It is accordingly an object of the present invention to provide a brake shoe which is relatively economical to manufacture and is quiet in use.

Another object of the present invention is to achieve the above object by the use of a method for making brake shoes which includes the step of molding the material forming the friction pad to the desired shape on the metal support.

A further object of the present invention is to provide a brake shoe in which the friction pad is only mechanically secured to the metal support by the use of rivets but yet in which the necessity of apertures in the friction pad is obviated.

In carrying out the present invention, there is provided a metal support having the same shape as that used for brake shoes formed by either the bonding or the riveting securing methods and the plate has a generally planar surface against which the pad is placed. As in the riveting method, there is formed a plurality of through apertures in the plate where it is desired to position rivets. However, the present invention inserts into each of the apertures a rivet that is formed to have an enlarged head and a shank formed with a shoulder portion and a reduced portion. Each rivet is placed in its aperture with the head and the shoulder projecting above the planar surface and the rivet is upset or clinched in place by conventional rivet clinching machinery. Such machinery exerts an axially compressing force and this will cause the shoulder end to be forced against the metal support and held thereat by the clinching operation. Accordingly, the portion of the metal support around each rivet aperture is clamped between the end of the shoulder of the rivet and the clinched end portion, which causes the shoulder end to be forced against the planar support to form an effective joint therewith.

In the next operation, the metal support is positioned in a mold together with a quantity of friction material and the friction material is molded to the desired shape by use of pressure and heat. When the material is shaped and sufficiently hardened, at least to be self-sustaining, the shoe is removed from the mold. If it is completely hardened, it is ready for use or, if not, it may be subjected to further curing or hardening operations.

The molding of the friction pad by at least the use of pressure causes the friction material to not only be forced to attain the shape of the mold, which is the desired shape of the friction pad, but also causes portions thereof to encircle the shoulder portion of each of the rivets beneath the head. Thus, when the friction pad becomes hardened, it is secured to the metal support by the heads of the rivets being embedded therein. The friction pad is accordingly only mechanically secured to the metal support as no attempt is made to effect a bond or cohesion between the pad and support or rivets.

Other features and advantages will hereinafter appear.

Referring to the drawing:

FIG. 1 is a plan of the metal support having rivets clinched therein.

FIG. 2 is a side view thereof, partly in section.

FIG. 3 is a pictorial representation of the forming of the friction pad onto the metal support by a molding process.

FIG. 4 is a plan of a completed brake shoe.

FIG. 5 is a side view thereof.

FIG. 6 is a detail taken on line 6—6 of FIG. 4, somewhat enlarged, showing a portion of the shoe which contains a rivet.

FIG. 7 is a view somewhat enlarged of a rivet which may be employed in the present invention.

FIGS. 8 and 9 are further embodiments of the present invention.

Referring to the drawing, the brake shoe of the present invention is generally indicated by the reference numeral 10 and is composed of two parts, a metal support 11 and a friction pad 12. The metal support 11 may have the shape desired to interconnect with its actuator and may normally vary with the type of actuator. However, most shoes, and especially the support herein disclosed, are formed to have a flat surface 13 which bears against the friction pad. A plurality of through apertures 14 extend through the support 11 and may have on the side 15 a countersunk portion such as indicated by the reference numeral 15a in FIG. 6, if desired.

In accordance with the present invention, each of the apertures 14 formed in the support 11 has clinched therein a rivet 16. As shown in FIG. 7, such a rivet includes a head 17 having a somewhat beveled periphery and a shank formed with a shoulder portion 18 and a reduced portion 19, together with an axial hole 20 that extends somewhat into the reduced portion 19. The junction between the end of the shoulder portion and the adjacent reduced portion is formed as a flat ledge 21. The diameter of the reduced portion 19 corresponds to the diameter of the apertures 14 within relatively wide manufacturing tolerances, while the diameter of the cylindrical shoulder portion is larger than the aperture to overlay the portion of the surface 13 about each aperture 14.

With the rivets 16 being positioned in the apertures 14 of the support, a conventional rivet upsetting or clinching machine is preferably utilized to cause the end portion of the reduced portion 19 to be spread to form a head by exerting compressive force axially on the rivet. This causes the ledge 21 of the rivet to be forcibly urged against the surface 13, while the upset portion of the rivet is contained within the counter-sunk portion 15a. It will be understood that, as the length of the shoulder portion 18 may be easily precisely controlled, the use of a rivet having a shoulder causes the heads to uniformly project a substantially equal distance from the surface 13. Moreover, the clinching operation, by forcing the ledge 21 against the surface 13, produces a tight joint therebetween which is essentially, for the purposes of the present invention, a seal between these abutting surfaces.

With the metal support having the rivets 16 therein so formed, it is then placed on a surface 22 of a molding machine, such as indicated pictorially in FIG. 3. The molding machine includes side walls 23 having ends abutting the support 11 and an interior shape which corresponds to the peripheral shape of the friction pad 12. A quantity of friction material 24, which may be in granular form and in a quantity sufficient to form the friction pad 12 to the desired thickness, is placed within the mold and the surface 13 and a piston 25 is moved downwardly in the direction of the arrow 26 to compress the material 24 to the desired shape of the friction pad 12. It will be understood that during this operation the molding machine may subject the friction material to heat to render the friction material 24 fluid and also to initiate the hardening process of the material in the shape of pad 12.

Upon completion of the molding of the friction material 24 to the shape of the friction pad, the completed shoe 10 is ejected. If necessary, it may be subjected to further operations for completely setting or hardening the friction material.

As shown in FIG. 6, the material of the friction pad during the molding operation is caused to have portions which encircle the shoulder portions of the rivet beneath the head 17 and are indicated by reference numeral 27. These portions, by being between the enlarged head of the rivet and the surface 13, serve to mechanically secure the friction pad to the metal support.

It will be understood that the friction material 24 is of a conventional formula which may include asbestos, pieces of metal and a resin binder, such that after the usual molding operation, the material becomes a hardened unitary mass, as is well known in the art. There is little, if any, adhesive bonding of the friction material to the metal support or rivets and no attempt is made to effect a bond or adhesive securement. It will also be noted that the ledge 21, by being forced against the surface 13 during the clinching of each rivet 15, forms with the surface 13 a seal which prevents the friction material, which has assumed some liquidity in order to be able to flow beneath the head of the rivet, from flowing into and through the apertures 14. Such leakage into the apertures 14 would cause voids beneath the heads of the rivet, reducing the portions 27 and weakening the securement of the pad to the support.

The method of the present invention has been found capable of using conventional machinery, such as rivet setting machinery and friction pad molding machinery with only slight adjustment of the latter, thereby enabling the method to be economically practiced.

The face 28 of the friction pad which engages the disk of the brake is smooth and thus has no voids or holes which may accumulate dirt and grit that might decrease the brake shoe's efficiency. Additionally, as the pad is molded against the surface 13 with pressure, it conforms thereto, thereby assuring that the pad and surface are in engagement throughout their mating surfaces.

Shown in FIG. 8 is a further embodiment of the present invention in which the shoulder 30 of a rivet 31 is tapered and forms a seat and seal with the sides of the aperture rather than utilizing the flat ledge 21 as in the prior embodiment.

In FIG. 9, there is shown a further embodiment in which a rivet 40 is straight shanked, without a shoulder and is assembled in the metal support 11 by setting the end 41. To maintain the head 42 spaced from the surface, the end may be made flush with the surface 15 by controlling the depth of the counter-sunk hole 15 and using the flat surface 22 or the end may be recessed and the surface 22 formed with pins that abut the end. In either construction, the end 41 forms a seal for obviating leakage of the friction material past the rivet through the aperture.

It will accordingly be understood that there has been disclosed a brake shoe and a method of manufacturing thereof which is extremely simple in construction and readily capable of being practiced. The invention utilizes a metal support, as heretofore used, and clinches onto the metal support a plurality of rivets. Each of the rivets includes a head and a shank which forms, with the metal support, a seal for preventing leakage of the friction material during the molding operation, thereby obviating the occurrence of voids which could structurally weaken the securement of the pad to the metal support. As the pad is thus only mechanically secured to the metal support, it has been found to be relatively free from noise when used on automotive vehicles.

Variations and modifications may be made within the scope of the claims and portions of the improvements may be used without others.

I claim:

1. A brake shoe comprising a metal support having a surface and a plurality of through apertures, a plurality of elements with each element having an enlarged head and a shank and with one element being positioned in each aperture, means securing each element to the support in its aperture with the head being spaced from the surface and with the shank forming a seal with the support, and a unitary friction pad overlying the surface and being formed of hardened friction material with a portion encircling the shank of each element beneath its head to effect mechanical securement of the pad to the support, in which each of the elements is a rivet having the end of the shank portion project past the aperture, in which the securing means enlarges the projecting end of the rivet, in which the shank of the rivet is formed with a shoulder portion adjacent the head with the shoulder portion being smaller than the head and larger than the aperture and in which the end of the shoulder is flat to form a ledge which abuts the surface to form a seal therewith, said pad being formed of hardenable material on said support with the seal preventing leakage of the material through its aperture prior to hardening.

2. A brake shoe comprising a metal support having a surface and a plurality of through apertures, a plurality of elements with each element having an enlarged head and a shank and with one element being positioned in each aperture, means securing each element to the support in its aperture with the head being spaced from the surface and with the shank forming a seal with the support, and a unitary friction pad overlying the surface and being formed of hardened friction material with a portion encircling the shank of each element beneath its head to effect mechanical securement of the pad to the support, in which each of the elements is a rivet having the end of the shank portion project past the aperture, in which the securing means enlarges the projecting end of the rivet, in which the shank of the rivet is formed with a shoulder portion adjacent the head with the shoulder portion being smaller than the head and tapering to a size less than the aperture and in which the shoulder portion wedges with the aperture to form a seal therewith, said pad being formed of hardenable material on said support with the seal preventing leakage of the material through its aperture prior to hardening.

* * * * *